US006191885B1

(12) United States Patent
Kitagawa (10) Patent No.: US 6,191,885 B1
(45) Date of Patent: Feb. 20, 2001

(54) CONFOCAL MICROSCOPE APPARATUS AND PHOTOGRAPHING APPARATUS FOR CONFOCAL MICROSCOPE

(75) Inventor: Hisao Kitagawa, Kunitachi (JP)

(73) Assignee: Olympus Optical Co., Ltd., Tokyo (JP)

( * ) Notice: Under 35 U.S.C. 154(b), the term of this patent shall be extended for 0 days.

(21) Appl. No.: 09/400,409

(22) Filed: Sep. 21, 1999

(30) Foreign Application Priority Data

Sep. 22, 1998 (JP) .................................................. 10-268307

(51) Int. Cl.[7] .................................................. G02B 21/00
(52) U.S. Cl. .......................... 359/368; 359/850; 359/851; 359/385
(58) Field of Search .................................... 359/850, 851, 359/664, 368, 369, 370, 371, 372, 376, 388, 389, 385, 234, 235, 236, 227; 250/234, 235, 216, 201.3, 201.4, 227.11, 306, 307, 23; 396/20, 24, 116

(56) References Cited

U.S. PATENT DOCUMENTS

| 4,927,254 | 5/1990 | Kino et al. ............................ 359/368 |
| 5,633,751 | * 5/1997 | Tanaami et al. ...................... 359/368 |
| 5,726,772 | * 3/1998 | Parker et al. ........................ 358/456 |
| 5,969,846 | * 10/1999 | Kishi .................................... 359/227 |
| 6,028,306 | * 2/2000 | Hayashi ............................... 250/235 |

FOREIGN PATENT DOCUMENTS 9-80315 3/1997 (JP) .
9-297267 11/1997 (JP) .

OTHER PUBLICATIONS

"Yokogawa's Confocal Microscope", Japan Industrial Publishing, "Optical Alliance", vol. 7, No. 12.
"Nipkow's Disk Type Confocal Fluorescent Microscope", Japan Industrial Publishing, "Optical Alliance", vol. 9, No. 10.

* cited by examiner

Primary Examiner—Mohammad Y. Sikder
(74) Attorney, Agent, or Firm—Frishauf, Holtz, Goodman, Langer & Chick, P.C.

(57) ABSTRACT

A confocal microscope apparatus includes a disk scanner for scanning a specimen with a laser beam, and camera main body for photographing a still image. An exposure time calculation circuit is arranged to generates an exposure time signal for the camera main body. A rotation sensor, a scan track start point/end point determination circuit, and a rotation period calculation circuit are arranged to generate a rotational period signal for the disk scanner. A comparator compares the exposure time signal with the rotational period signal, so that a motor controller and a motor driver control rotation of a motor of the disk scanner by a comparison output from the comparator.

18 Claims, 6 Drawing Sheets

CONFOCAL MICROSCOPE APPARATUS AND PHOTOGRAPHING APPARATUS FOR CONFOCAL MICROSCOPE

BACKGROUND OF THE INVENTION

The present invention relates to a confocal microscope apparatus and a photographing apparatus for a confocal microscope, for photographing a confocal image of a microscope specimen.

In recent years, confocal microscopes have rapidly spread owing to their improved effects in optical performance called confocal effects including a sectioning effect along the optical axis and a super-resolution effect. These confocal microscopes can be roughly classified into two, single-beam type (fixed-pinhole type/a single pinhole) and multi-beam type (movable pinhole type/a plurality of pinholes) on the basis of the scanning principle and the basic arrangements of a scanner and an optical system.

The single-beam type confocal microscope drives a laser beam for scanning, using a galvanometer mirror or an optical deflector such as an acousto-optical deflector (AOD). The-multi-beam type confocal microscope uses a rotating disk scanner (to be referred to as a "disk scanner") represented by a scanner which rotates a Nipkow's disk on which a plurality of pinholes are formed in a spiral pattern.

The latter confocal microscope using the rotating disk scanner, and particularly a multi-beam type confocal microscope using a disk scanner with a microlens is described in detail in "Yokogawa's Confocal Microscope" (Japan Industrial Publishing, "Optical Alliance", Vol. 7, No. 12), and "Nipkow's Disk Type Confocal Fluorescence Microscope" (Japan Industrial Publishing, "Optical Alliance", Vol. 8, No. 10). A most significant feature of this type is that this microscope enables direct observation with the naked eye and photography, and enables observation and photography of a color image.

For this reason, the multi-beam type confocal microscope with a disk scanner whose main object is visual inspection is popular for industrial purposes, and particularly semiconductor inspection purposes of ICs and the like. To the contrary, the single-beam type confocal microscope is still popular in medical and biological study purposes which have strong demands for observing, e.g., a cell dyed with a fluorochrome at high image quality to photograph a still image.

Recently, as described in the above references, a multi-beam type confocal microscope using a disk scanner with a microlens, suitable for fluorescent observation, has appeared and is also used in medical and biological study purposes. However, the application is often limited to real-time observation at a video rate or more for the movement of a cell injected with a fluorescent indicator such as Ca ions or pH.

This arises from marketing factors such as a small number of manufacturers for confocal microscopes using disk scanners, resulting in few product variations, and poor balance between apparatus cost and performance, resulting in low cost performance. However, it should also be noted that the disk scanner design currently assumes operation in combination with a real-time moving picture photographing apparatus such as a video camera.

Figure 6:
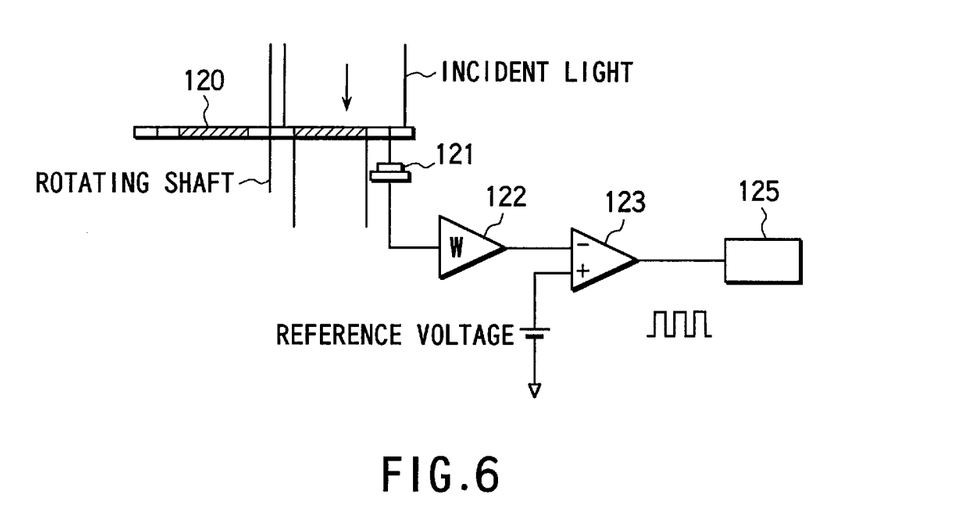
FIG. 6 is a view showing a circuit arrangement for sensing a moving picture by a confocal microscope using a conventional disk scanner.

For example, in the technique disclosed in Jpn. Pat. Appln. KOKAI Publication No. 9-80315, as shown in FIG. 6, rotation of a Nipknow's disk 120 is detected by a photodiode 121 to generate a trigger signal to an image sensing device 125 using a current-to-voltage converter 122 and a voltage comparator 123. The scan period and image sensing period are synchronized to eliminate any scan fluctuation and obtain a sensed image free from any bright/dark stripe.

The image sensing device 125 assumed in this technique continuously photographs at a predetermined period, i.e., 1/30 sec, like a video camera using a CCD. That is, this technique does not consider use conditions for photographing a still image, and particularly photographing conditions under which the exposure time changes over a wide range of several hundredth sec to several ten sec in accordance with the specimen brightness.

Figure 7:
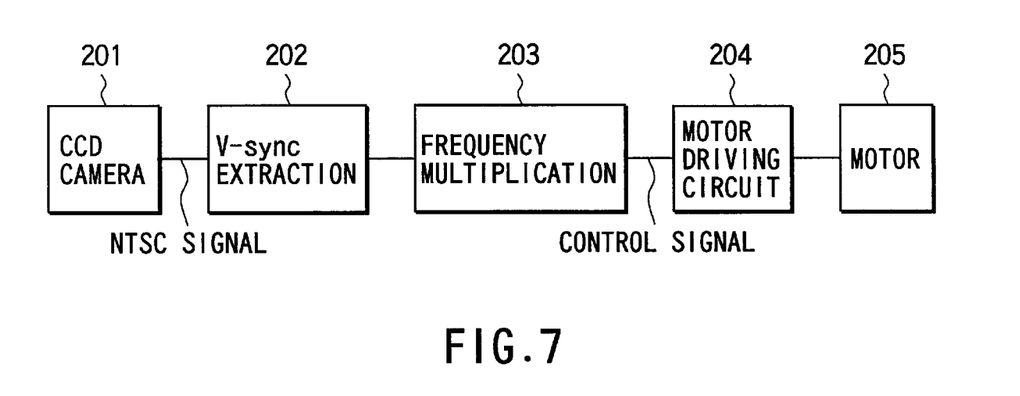
FIG. 7 is a block diagram showing a circuit arrangement for sensing a moving picture by a confocal microscope using a conventional disk scanner.

In the technique disclosed in Jpn. Pat. Appln. KOKAI Publication No. 9-297267, as shown in FIG. 7, a vertical sync signal is extracted (202) from a video signal (NTSC signal) from a CCD camera 201 of a video photographing device, and the frequency of the extracted signal is multiplied (integer multiple) (203) to supply a control signal to a motor driver 204 for driving a disk scanner. The number of turns of a motor 205 can be controlled based on the NTSC signal to realize a motor control device capable of obtaining an image free from any scanner fluctuation and stripe.

Again, however, the image sensing device is limited to the CCD camera 201 using a NTSC signal, and does not consider any application purpose of photographing a still image whose exposure time changes over a wide range.

As described above, since the conventional disk scanner assumes the CCD camera 201 as an image sensing device, the rotational speed and rotational period of the scanner are set to about 30 rps corresponding to a video rate (about 30 Hz), and about 1/30 sec (about 0.033 sec), respectively. Fine adjustment of the rotational speed in synchronism with the CCD camera 201 is possible, but a change of the rotational speed over a wide range is not possible.

An explanation will be given to a problem arising when the exposure time changes over a wide range of several hundredth sec to several ten sec depending on the specimen brightness, similar to the use conditions of general micrography.

Assume that the disk scanner rotates at about 30 rps corresponding to a video rate (about 30 Hz). For an exposure time of about 0.01 sec (1/100 sec), the scanner rotates only about 0.3 times within the exposure time. For an exposure time of 10 sec, the scanner rotates about 300 times within the exposure time. For this reason, when the exposure time changes over a wide range, the number of turns of the scanner while obtaining an image greatly changes depending on the exposure time.

Image noise such as stripes caused by a nonuniform layout of pinholes on the disk scanner in the prior arts of the above references may be accumulated and eliminated by increasing the number of scan operations for a scan pattern (scan track) on the scanner, i.e., increasing the total number of turns of the scanner within the exposure time for photographing one image. For this reason, when the specimen is bright and the exposure time is short, the noise accumulation and elimination effect degrades as the total number of turns of the disk within the exposure time decreases. As a result, image noise by the stripes of the pinhole pattern stands out, and a high-quality still image is difficult to obtain.

Especially when the exposure time is only 0.01 sec (1/100 sec), the scanner rotates only about 0.3 times within the exposure time, and the number of turns of the disk is a decimal fraction smaller than 1. In this case, even if the exposure start timing is aligned with the start point of a scan track, the exposure end timing does not coincide with the end point of the scan track.

Assume that the start and end points of scan tracks are set at a plurality of portions, e.g., at intervals of a rotation angle of 30° (12 scan tracks per turn) for one disk turn, and the end point of a scan track accidentally coincide with the exposure end timing for an exposure time of 0.0833 sec (1/12 sec). Even in this case, if the specimen brightness slightly changes to change the exposure time, the end point of the scan track immediately shifts from the exposure end timing.

More specifically, when the exposure time changes depending on the specimen brightness in still image photography by a conventional multi-beam type confocal microscope using a disk scanner, the start and end points of the scan track cannot always coincide with the exposure start and end timings. Particularly for a short exposure time, simultaneously when the number of scan track scanning operations decreases, the exposure start and end timings shift from the start and end points of the scan track. Then, image noise such as stripes caused by a nonuniform pinhole layout is easily superposed on an image, failing to obtain a high-quality still image.

BRIEF SUMMARY OF THE INVENTION

The present invention has been made in consideration of the above situation, and has as its object to photograph a high-quality still image in a confocal microscope using a disk scanner.

According to a first aspect of the present invention, there is provided a confocal microscope apparatus comprising:

a light-emitting portion for emitting a light beam with which a specimen to be observed is irradiated;

a rotatable disk scanner having a plurality of pinholes formed in a disk for the light beam to pass therethrough between the light-emitting portion and the specimen, the pinholes being arranged to move through a first position facing the light-emitting portion and scan the specimen with the light beam having passed through the pinholes, along with rotation of the disk scanner;

a confocal optical system for conjugating the first position and a second position on the specimen to cause the light beam having passed through the pinholes to be radiated onto the specimen, and to cause a light beam from the specimen to form an image on the disk;

a camera for photographing a still image of the image formed by the confocal optical system;

means for generating an exposure time signal representing an exposure time of the camera;

means for generating a rotational period signal representing a rotational period of the disk scanner; and means for comparing the exposure time signal with the rotational period signal to generate based on a comparison result a signal concerning at least one certain condition which must be changed among conditions of the disk scanner, the confocal optical system, and the camera.

According to a second aspect of the present invention, there is provided an apparatus for photographing a confocal image in cooperation with a microscope, comprising:

a light-emitting portion for emitting a light beam with which a specimen to be observed is irradiated;

a rotatable disk scanner having a plurality of pinholes formed in a disk for the light beam to pass therethrough between the light-emitting portion and the specimen, the pinholes being arranged to move through a first position facing the light-emitting portion and scan the specimen with the light beam having passed through the pinholes, along with rotation of the disk scanner;

an optical system portion for forming, in cooperation with an optical system portion of the microscope, a confocal optical system for conjugating the first position and a second position on the specimen to cause the light beam having passed through the pinholes to be radiated onto the specimen, and to cause a light beam from the specimen to form an image on the disk;

a camera for photographing a still image of the image formed by the confocal optical system;

means for generating an exposure time signal representing an exposure time of the camera;

means for generating a rotational period signal representing a rotational period of the disk scanner; and means for comparing the exposure time signal with the rotational period signal to generate based on a comparison result a signal concerning at least one certain condition which must be changed among conditions of the disk scanner, the confocal optical system, and the camera.

According to the present invention, even if the exposure time changes depending on the specimen brightness, the total number of turns of the disk within the exposure time can be kept constant. The exposure start and end timings can be synchronized with the disk rotational position, and the disk positions at the start and end of exposure can be maintained at the start and end points of the scan track pattern. Accordingly, striped noise by a pinhole pattern can be suppressed to photograph a high-quality still image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described in detail below with reference to the several views of the accompanying drawing. In the following description, the same reference numerals denote the same parts having almost the same functions and structures, and a repetitive description thereof will be omitted.

(First Embodiment)

The first embodiment will be described, where the present invention is applied to a confocal microscope apparatus including an erect microscope and a photography.

Figure 1:
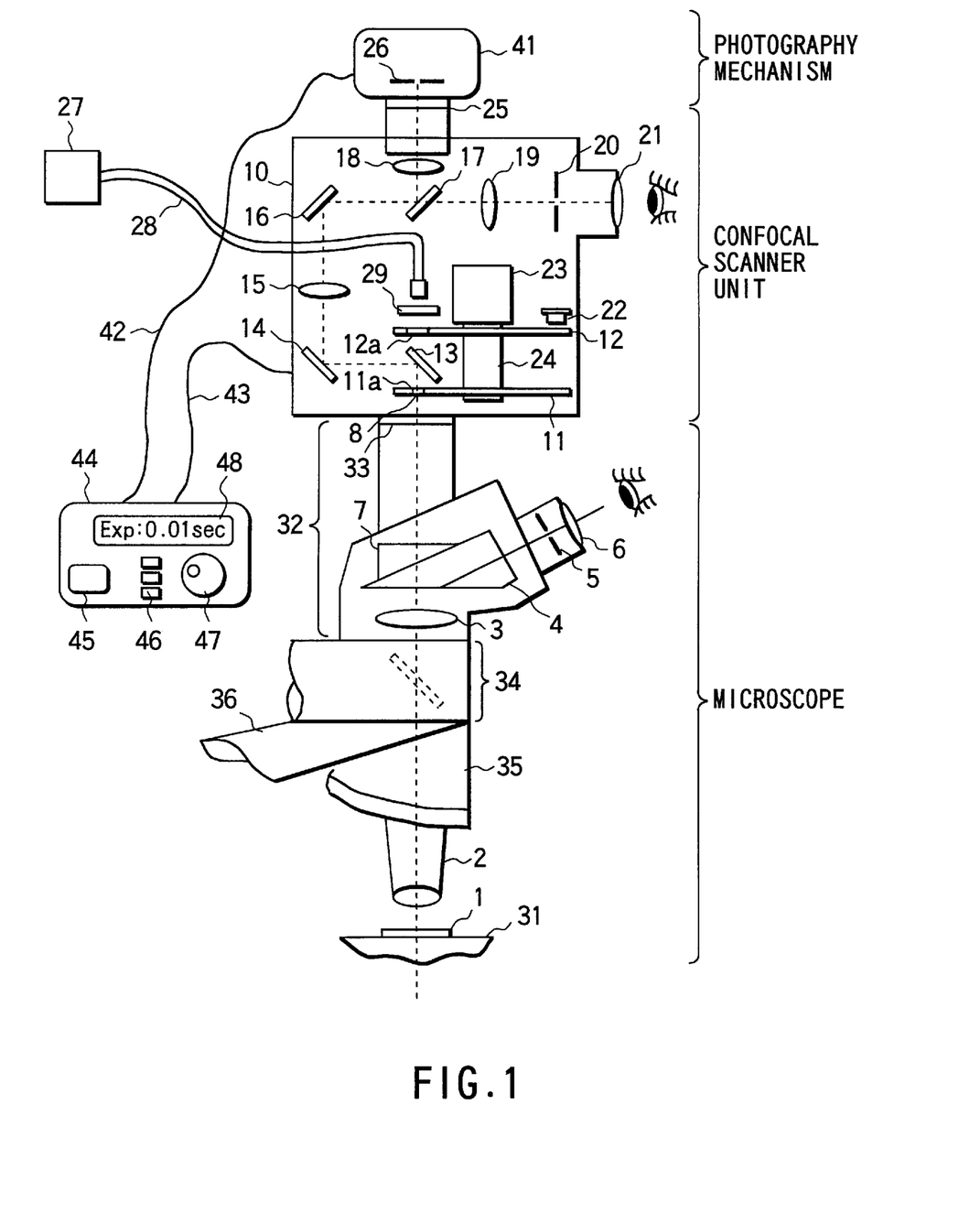
FIG. 1 is a view showing the arrangement of an optical system according to the first embodiment of the present invention.

FIG. 1 shows the arrangement of the whole optical system of the confocal microscope apparatus. The optical system is made up of three parts, photography mechanism, confocal scanner unit 10, and microscope.

The microscope is an erect microscope having a triple-lens barrel 32 with a photographing optical path. FIG. 1 shows an only upper observation optical system from the upper surface of a stage 31. The photography mechanism contains a camera main body 41 and a control unit 44. The camera main body 41 and control unit 44 are connected by a cable 42 in two ways. The control unit 44 and confocal scanner unit 10 are connected by a cable 43 in two ways.

In the triple-lens barrel 32, a 30° prism 4 and a cylindrical prism 7 are selectively exchangeably inserted in the optical path on a slider (not shown). When the 30° prism 4 is inserted in the optical path, the microscope can be used as a general one to enable observation with the naked eye via an eyepiece lens 6. More specifically, this enables transmission observation using illumination light from a transmission illumination light source (not shown) below the stage 31, or incident fluorescent observation using an optional incident-light projection tube 34.

When the cylindrical prism 7 is inserted in the optical path, an optical path which conjugates an image surface 8 (at the position of a pinhole 11a (to be described below)) formed in the confocal scanner unit 10 above the straight cylindrical portion of the triple-lens barrel 32, and a position on a specimen 1 placed on the stage 31 is formed. In this case, the confocal scanner unit 10 enables naked eye observation or photography of a confocal image.

The confocal scanner unit 10 is mounted on the straight cylindrical portion of the triple-lens barrel 32 via an image sensor mount 33. The confocal scanner unit 10 comprises a pinhole disk 11 made from a Nipkow's disk on which a plurality of pinholes 11a are laid out in a spiral pattern, and a condensing disk 12 having microlenses 12a laid out to correspond to the pinholes 11a. The Nipkow's disk is disclosed in, e.g., U.S. Pat. No. 4,927,254, issued May 22, 1990 to Gordon S. Kino et al., the teachings of which are hereby incorporated by reference.

A laser beam emitted by a laser source 27 is guided to the confocal scanner unit 10 via a laser fiber 28. The laser source 27 is placed on a floor apart from a table on which the microscope is mounted, in order to prevent transfer of vibrations, heat, and the like. The laser beam guided into the confocal scanner unit 10 is collimated by a collimator lens 29, and the parallel beam is incident on the condensing disk 12 having the microlens array.

The formation pattern of the microlenses 12a on the condensing disk 12 and the pattern of the pinholes 11a on the pinhole disk 11 positioned coaxially with the condensing disk 12 can be manufactured to be identical by a semiconductor process. In the manufacturing process of coupling the two disks 11 and 12 by a coupling shaft 24, the two patterns are aligned with each other in advance while each pair of microlens 12a and pinhole 11a have their centers matched. The laser beams condensed by the plurality of microlenses 12a formed on the condensing disk 12 pass through corresponding pinholes 11a on the pinhole disk 11.

The position of each pinhole 11a of the pinhole disk 11 coincides with the position of the image surface 8. The beam having passed through the pinhole 11a is focused on the confocal position of the specimen 1 via the cylindrical prism 7, imaging lens 3, and objective lens 2 mounted on an objective revolver 35.

A fluorescent indicator is injected in the cell of the specimen 1 in advance (micro-injection), and excited by the incident laser beam to emit fluorescence. The fluorescence emitted by the specimen 1 travels back to the pinhole 11a of the pinhole disk 11 via the objective lens 2, imaging lens 3, and cylindrical prism 7 to form a confocal optical path. The integrally coupled pinhole disk 11 and condensing disk 12 are rotated by a motor 23, thereby obtaining a scanned confocal image.

The fluorescence having passed through the pinhole disk 11 from the specimen 1 side is reflected by a dichroic mirror 13 fixedly arranged in the optical path in a space between the pinhole disk 11 and condensing disk 12. This fluorescence is deflected from the laser path to the left in FIG. 1, reflected by mirrors 14 and 16, and deflected to the right in FIG. 1.

A mirror 17 is mounted at a position immediately below the camera main body 41 to be removable from the optical path. When the mirror 17 is removed from the optical path, a confocal image formed again on an image surface 20 by relay lenses 15 and 19 can be observed with the naked eye. When the mirror 17 is inserted in the optical path, the optical path is formed upward in FIG. 1. Then, a confocal image formed again on an image surface 26 by the relay lenses 15 and 18 can be adjusted to the camera main body 41 mounted via a mount 25 and sensed by the camera main body 41.

A circuit for controlling photographing operation of the camera main body 41 is incorporated in the control unit 44 connected by the cable 42, as described above. As also described above, the control unit 44 is connected by the cable 43 to a motor driver (not shown) for rotating the motor 23 coupled to the coupling shaft 24 in the confocal scanner unit 10, and a rotation sensor 22 for detecting the rotational positions of the pinhole disk 11 and condensing disk 12. The control unit 44 controls the operations of the motor 23 and camera main body 41 while detecting the rotational position of the motor 23 (i.e., the rotational position of the disk scanner) by the rotation sensor 22. The rotation sensor 22 detects the rotational position of the pinhole disk 11, and particularly the start and end points of a scan track formed on the pinhole pattern to generate a trigger signal.

Note that the control unit 44 comprises various manipulation switches such as an exposure button 45 for instructing exposure, an mode switching button 46 for switching the photographing mode, and a control knob 47 for adjusting a controlled variable which changes continuously, and a display panel 48 made from, e.g., a liquid crystal display panel for displaying the exposure time.

Figure 2:
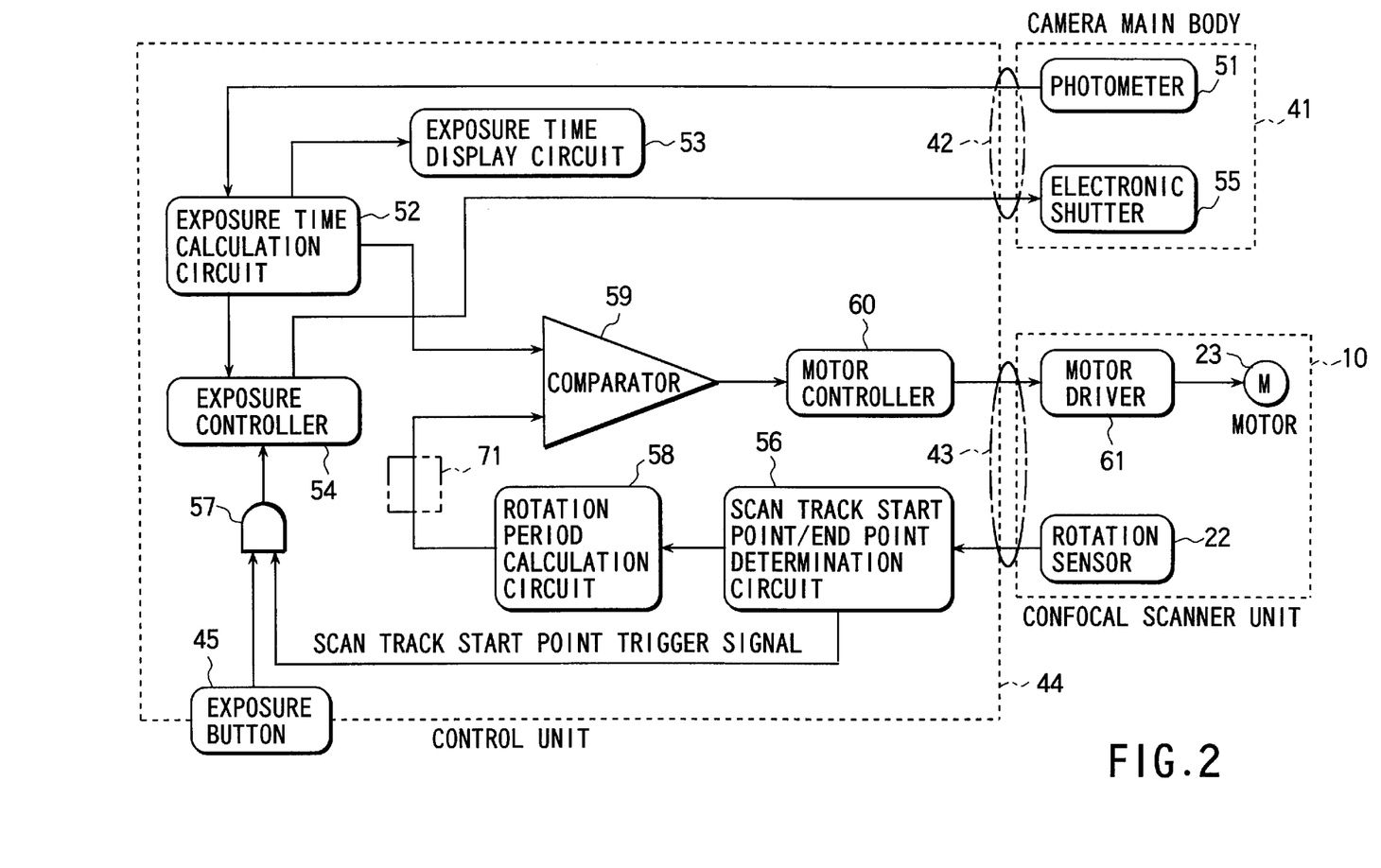
FIG. 2 is a block diagram showing a circuit arrangement according to the first embodiment.

FIG. 2 is a block diagram showing the arrangement of an electronic circuit according to the first embodiment provided to the control unit 44, camera main body 41, and confocal scanner unit 10.

A photometric signal that is used to measure the intensity of light from the specimen 1 and is obtained by a photometer 51 in the camera main body 41 is inputted to an exposure time calculation circuit 52 in the control unit 44 via the cable 42. The exposure time calculation circuit 52 calculates the exposure time from the photometric signal, displays the exposure time on the display panel 48 (see FIG. 1) via an exposure time display circuit 53, and outputs an exposure time signal to an exposure controller 54.

The exposure controller 54 directly receives manipulation signals from the mode switching button 46 and control knob 47 (see FIG. 1), and can set the photometric mode, sensitivity, and exposure correction amount. These settings do not directly relate to the present invention, and a description thereof will be omitted. The exposure controller 54 transmits an exposure start signal and exposure end signal to an electronic shutter 55 in the camera main body 41 in accordance with the exposure time signal from the exposure time calculation circuit 52 and a manipulation signal from the exposure button 45, thereby opening/closing the electronic shutter 55 and controlling exposure.

Note that the exposure start signal does not correspond to a signal from the exposure button 45 manipulated by a user in a strict sense. That is, the exposure start signal corresponds to an output from an AND circuit 57 which receives the signal from the exposure button 45 together with a scan track start point trigger signal generated by a scan track start point/end point determination circuit 56 in response to a detection signal from the rotation sensor 22 in the confocal scanner unit 10. Thus, exposure starts in synchronism with the start point of the scan track of the pinhole pattern formed on the pinhole disk 11 of the disk scanner.

Similar to the scan track start point trigger signal, the scan track start point/end point determination circuit 56 also generates a scan track end point trigger signal based on the detection output from the rotation sensor 22 in the confocal scanner unit 10. The scan track end point trigger signal is synchronized with the end point of the scan track of the pinhole pattern formed on the pinhole disk 11 of the disk scanner.

The scan track start point/end point determination circuit 56 outputs both the scan track start point trigger signal and scan track end point trigger signal to a rotational period calculation circuit 58. The rotational period calculation circuit 58 calculates the time necessary for the disk scanner to rotate once from these signals to generate a rotational period signal representing the calculated time, and output the rotational period signal to a comparator 59. The comparator 59 compares the rotational period signal with an exposure time signal sent from the exposure time calculation circuit 52, and outputs a difference signal to a motor controller 60. The motor controller 60 controls a motor driver 61 for rotating the motor 23 on the basis of the difference signal sent from the comparator 59.

In this arrangement, since the difference signal between the exposure time and rotational period is generated using the comparator 59 and transmitted to the motor controller 60, the motor controller 60 controls the motor driver 61 so as to make the exposure time by the electronic shutter 55 and the rotational period of the motor 23 coincide with each other. By forming this feedback control loop, the exposure time and rotational period always accurately agree with each other, and the exposure start timing is synchronized with the scan track start point trigger signal. As a result, the exposure end timing can also be synchronized with the scan track end point trigger signal.

Note that a circuit 71 for multiplying (integer multiple) a rotational period signal can be interposed between the rotational period calculation circuit 58 and comparator 59 to selectively multiply a rotational period signal outputted from the rotational period calculation circuit 58 and transmit the multiplied signal to the comparator 59. With this arrangement, the number of turns of the disk within the exposure time is incremented at an integer rate of 1, 2, or the like, so that exposure can be synchronized with the scanner rotational position without greatly decreasing the number of turns of the disk scanner, even if the exposure time is prolonged in the order of several sec.

In the embodiment shown in FIG. 2, each of the exposure start and end timings is controlled in synchronism with the rotational position of the disk scanner to keep the total number of turns of the disk within the exposure time constant. In other words, the rotational speed is controlled high for a bright specimen and low for a dark specimen. Accordingly, even if the exposure time varies over a wide range depending on the specimen brightness, a high-quality still image can be photographed while suppressing striped noise caused by the pinhole pattern formed on the disk scanner.

(Second Embodiment)

The second embodiment will be described, where the present invention is applied to a confocal microscope apparatus including an erect microscope and a photography.

The arrangement of an optical system in the second embodiment is the same as that described with reference to FIG. 1.

Figure 3:
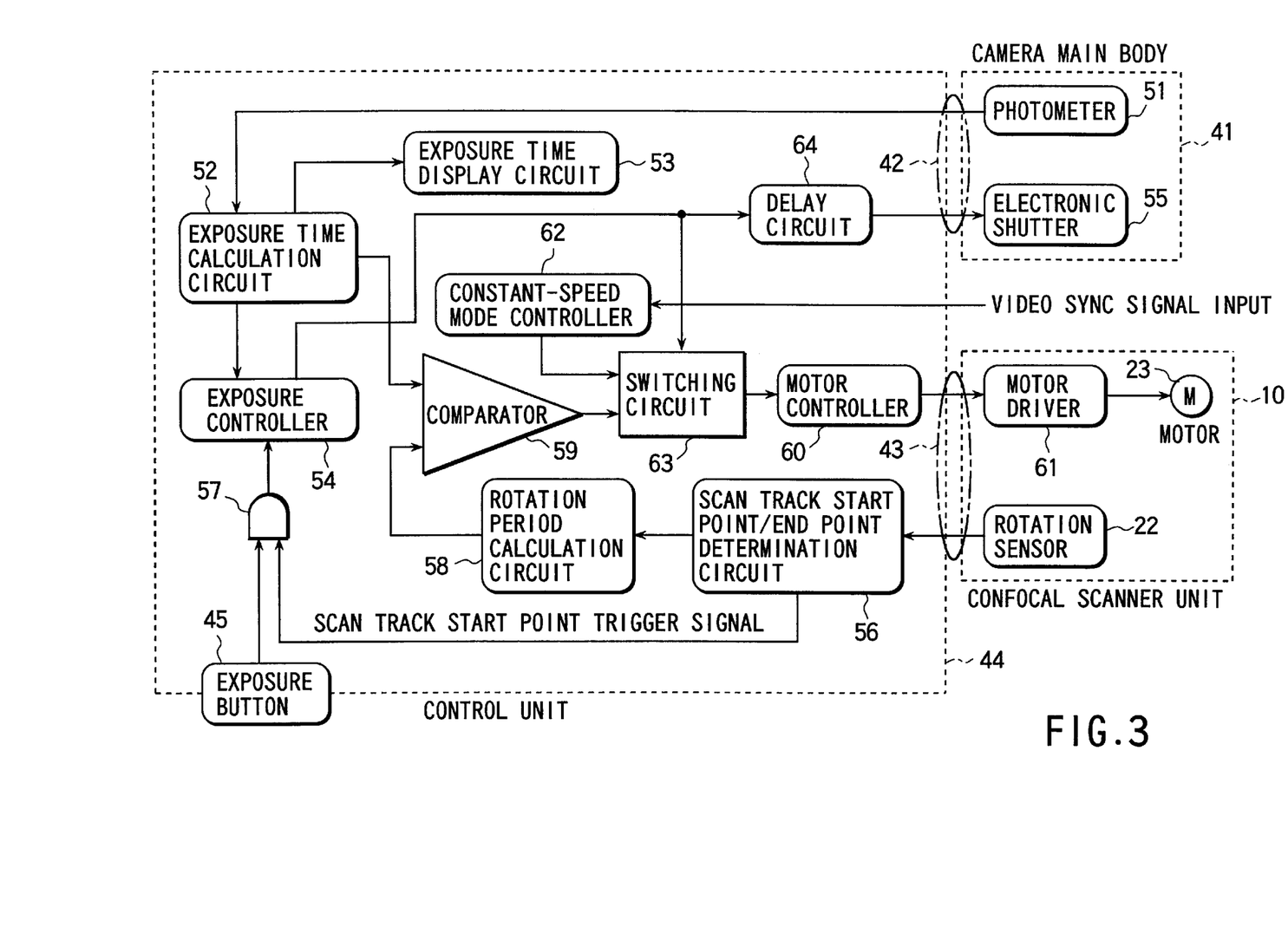
FIG. 3 is a block diagram showing a circuit arrangement according to the second embodiment.

FIG. 3 is a block diagram showing the arrangement of an electronic circuit according to the second embodiment provided to the control unit 44, camera main body 41, and confocal scanner unit 10. The electronic circuit shown in FIG. 3 is basically the same as that shown in FIG. 2 except for the following difference.

The second embodiment is arranged in consideration of a case where the user observes a specimen with the naked eye via an eyepiece lens 21 without using any camera main body 41, and a case where a video camera device (not shown) is mounted instead of the camera main body 41. In mounting the video camera device, a video sync signal equivalent to a vertical sync signal is inputted from the video camera device to the control unit 44 via a cable (not shown).

The input video sync signal is received by a constant-speed mode controller 62. The constant-speed mode controller 62 generates a constant-speed rotational period signal corresponding to a video rate (about 30 Hz) in synchronism with input of the video sync signal, and outputs the constant-speed rotational period signal to a switching circuit 63. The switching circuit 63 selects either one of the constant-speed rotational period signal and a difference signal outputted from a comparator 59 in response to an exposure start signal from an exposure controller 54, and outputs the selected signal to a motor controller 60. A delay circuit 64 is interposed between the exposure controller 54 and electronic shutter 55 to transfer an exposure start signal and exposure end signal from the exposure controller 54 to the electronic shutter 55 with a proper time delay.

When the camera main body 41 is mounted in this arrangement to take a picture (still image) without mounting any video camera device, the operation is controlled as follows. An exposure time signal is inputted from an exposure time calculation circuit 52 to the exposure controller 54 upon photometry by a photometer 51. The exposure controller 54 outputs an exposure start signal and exposure end signal corresponding to the exposure time signal to the switching circuit 63, and to the electronic shutter 55 via the delay circuit 64. At this time, the delay circuit 64 does not delay the signals. The switching circuit 63 selects a difference signal outputted from the comparator 59, and transmits the signal to the motor controller 60. This operation is the same as that described in the first embodiment.

When no camera main body 41 is mounted, the mirror 17 is removed from the optical path, and a user observes a specimen 1 with the naked eye via the eyepiece lens 21, the operation is controlled as follows. Since the constant-speed mode controller 62 does not receive any video sync signal, the controller 62 generates a constant-speed rotational period signal having a predetermined constant speed, which is unsynchronized, e.g., about 30 rps corresponding to a video rate (about 30 Hz) compatible with a video camera device (to be described later). The constant-speed mode controller 62 outputs the generated signal to the switching circuit 63. At this time, since no camera main body 41 is mounted, the exposure controller 54 does not receive any exposure time signal, so it cannot output any exposure start signal and exposure end signal.

Since no signal is inputted from the exposure controller 54, the switching circuit 63 selects the constant-speed rotational period signal from the constant-speed mode controller 62, and supplies the signal to the motor controller 60. The motor controller 60 rotates the motor 23 at a constant speed by the motor driver 61 in accordance with the constant-speed rotational period signal. The user can stably observe the specimen 1 with the naked eye via the eyepiece lens 21.

When the mirror 17 is inserted in the optical path, the video camera device is mounted in place of the camera main body 41, and a video sync signal is inputted to the constant-speed mode controller 62 to photograph a moving picture, the operation is controlled as follows. The constant-speed mode controller 62 generates a constant-speed rotational period signal of about 30 rps corresponding to a video rate (about 30 Hz) in synchronism with the input video sync signal. The constant-speed mode controller 62 outputs the generated signal to the switching circuit 63. At this time, since no camera main body 41 is mounted, the exposure controller 54 does not receive any exposure time signal, so it cannot output any exposure start signal and exposure end signal.

Since no signal is inputted from the exposure controller 54, the switching circuit 63 selects the constant-speed rotational period signal synchronized with the video sync signal from the constant-speed mode controller 62, and supplies the signal to the motor controller 60. The motor controller 60 rotates the motor 23 at a constant speed by the motor driver 61 in accordance with the constant-speed rotational period signal. A moving picture can be photographed while the video camera device is synchronized with the rotational period of the disk scanner.

In this way, when the user observes with the naked eye, or the video camera device is mounted instead of the camera main body 41 to photograph a moving picture, the motor 23 for rotating the disk scanner is rotated at a constant speed. To the contrary, when the camera main body 41 is mounted to photograph a picture (still image), the rotational speed of the motor 23 is variably controlled over a wide range so as to maintain the total number of turns of the disk scanner in correspondence with the exposure time during which the electronic shutter 55 of the camera main body 41 is open. That is, the second embodiment switches the rotational speed of the motor 23 in every operation.

In the second embodiment, an exposure signal from the exposure controller 54 is delayed via the delay circuit 64 and supplied to the electronic shutter 55 in order to absorb a time lag in shifting the rotational speed of the motor 23 from a constant-speed mode to a photographing mode interlocked with the exposure time, and operate the electronic shutter 55 after the rotational speed of the motor 23 is interlocked with the exposure time. The delay time can be variably set in accordance with the response speed of the control system.

In the second embodiment, a signal for switching the switching circuit 63 is an exposure signal outputted from the exposure controller 54. Alternatively, a detection sensor may be disposed at the insertion position of the mirror 17, so that consideration can be given as to whether a signal from this sensor and a video sync signal have been inputted. For example, when no mirror 17 exists on the optical path, observation with the naked eye is done; when the mirror 17 exists on the optical path and no video sync signal is inputted, photography of a picture (still image) by the camera main body 41 is done; and when the mirror 17 exists on the optical path and a video sync signal is inputted, photography of a moving picture by the video camera device is done. In this fashion, a rotational period signal supplied to the motor controller 60 may be switched.

(Third Embodiment)

The third embodiment will be described, where the present invention is applied to a confocal microscope apparatus including an erect microscope and a photography.

The arrangement of an optical system in the third embodiment is the same as that described with reference to FIG. 1.

Figure 4:
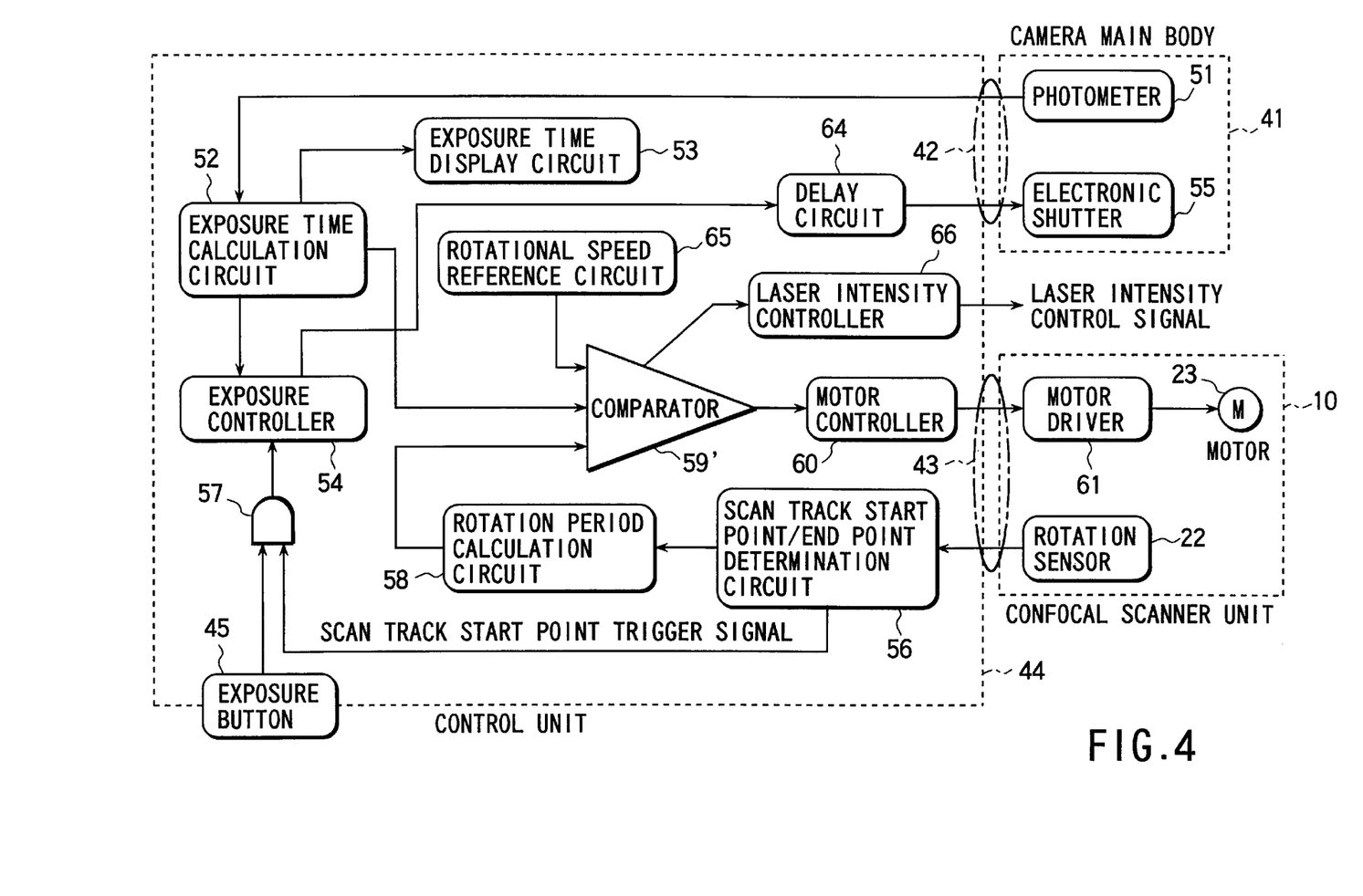
FIG. 4 is a block diagram showing a circuit arrangement according to the third embodiment.

FIG. 4 is a block diagram showing the arrangement of an electronic circuit according to the third embodiment provided to the control unit 44, camera main body 41, and confocal scanner unit 10. The electronic circuit shown in FIG. 4 is basically the same as that shown in FIG. 2 except for the following difference.

In the third embodiment, a comparator 59' receives a rotational period limit signal representing the upper limit of the rotational period of the motor 23 from a rotational speed reference circuit 65. A laser intensity controller 66 which has received a signal outputted from the comparator 59' appropriately outputs a laser intensity control signal to the microscope to suppress the intensity of a laser beam oscillated and outputted from the laser source 27 (see FIG. 1).

In this arrangement, the rotational speed reference circuit 65 always outputs to the comparator 59' a rotational period limit signal corresponding to the upper limit of the rotational speed of the motor 23. The comparator 59' compares a rotational period signal from a rotation period calculation circuit 58 with the rotational period limit signal from the rotational speed reference circuit 65.

If the rotational period limit signal is larger than the rotational period signal, i.e., the rotational speed of the disk scanner does not exceed the upper limit, the comparator 59' compares the rotational period signal with an exposure time signal from an exposure time calculation circuit 52, while controlling the motor 23 so as to make the rotational period signal from the rotation period calculation circuit 58 coincide with the exposure time signal. This operation is the same as that described in the first embodiment.

If the rotational period limit signal is smaller than the rotational period signal, i.e., the rotational speed of the disk scanner exceeds the upper limit, the comparator 59' outputs a control signal to the laser intensity controller 66 to decrease the value of the laser intensity control signal outputted from the laser intensity controller 66 to the microscope.

Under this control, when a rotational period limit signal outputted from the rotational speed reference circuit 65 is smaller than an actual rotational period signal outputted from the rotation period calculation circuit 58, i.e., the rotational speed of the disk scanner exceeds the upper limit, the laser beam intensity on the microscope side is reduced to decrease the brightness of an image on the confocal microscope which is too high for the rotational speed of the disk scanner.

Further, under this control, an resultant influence is applied to the exposure time outputted from the exposure time calculation circuit 52 in accordance with a photometric signal from a photometer 51 in the camera main body 41, to prolong the exposure time by an electronic shutter 55. As a result, the comparator 59' recovers a feedback control loop for controlling the motor rotational speed of the motor 23 to prolong the rotational period of the motor 23 in accordance with the exposure time.

Consequently, when the rotational speed of the disk scanner exceeds the upper limit, the comparator 59' decreases the laser intensity on the microscope side based on the comparison result between the rotational speed reference signal and rotational period signal. The value of the exposure time signal is increased to prevent the rotational speed of the disk scanner from exceeding the upper limit. The control can be continued while maintaining a fixed relationship between the exposure time and rotational period.

Note that the effects can be enhanced by setting the upper limit of the rotational speed of the motor 23 for rotating the disk scanner in consideration of maintenance so as to prevent overheat of the motor 23, and destruction and a decrease in service life of the building components of electrical and mechanical systems caused by too high a rotational speed. A follow-up delay of the scanner and an increase in mechanical vibration along with an excessive increase in rotational speed degrade the image quality of the confocal microscope. To maintain good image quality, it is effective to set the upper limit of the rotational speed of the motor 23. In this case, a necessary image quality changes depending on the use conditions of the optical system such as the magnification of an objective lens 2 of the microscope and the brightness of a specimen 1, and apparatus conditions such as the sensitivity of the camera main body 41.

In the third embodiment, the value of a rotational period limit signal transmitted from the rotational speed reference circuit 65 to the comparator 59' can also be optimized based on the use conditions of the optical system and a target image quality level in accordance with manipulation inputs from the mode switching button 46 and control knob 47 on the control unit 44 in FIG. 1. This can make the exposure time coincide with the rotational period of the disk scanner while maintaining the rotational speed of the disk scanner conforming to the use conditions.

The third embodiment performs only control concerning the upper limit of the rotational speed of the disk scanner. Further, the third embodiment can also be applied to control concerning the lower limit of the rotational speed of the disk scanner. When the rotational speed of the disk scanner is too low and the rotational period is much longer than a predetermined value, the intensity of a laser beam oscillated and outputted from the microscope side is increased to increase the rotational speed of the disk scanner.

In the third embodiment, the laser beam oscillation intensity is electrically controlled. Instead, the same effects can be attained by adjusting the brightness of the optical system of the microscope by a motor means, e.g., a mechanism of selectively switching and inserting a plurality of ND filters in the optical path of the microscope.

The controlled variable in the third embodiment is not limited to the brightness of the optical system of the microscope, but may include the exposure correction amount and sensitivity setting value of the photography mechanism. In this case, for example, the exposure correction amount and sensitivity setting value of the photography mechanism are changed on the basis of the comparison result between a rotational speed reference signal outputted from the rotational speed reference circuit 65 and a rotational period signal outputted from the rotation period calculation circuit 58, thereby changing the exposure time calculated by the exposure time calculation circuit 52. While the rotational speed of the disk scanner is maintained in the range defined by the upper and lower limits, the control can be continued with a constant relationship between the exposure time and rotational period without necessarily changing the brightness of the optical system of the microscope.

In the above description, various adjustments and control operations, such as adjustment of the laser beam intensity, switching between insertion/removal of the ND filter, and a change of the exposure correction amount and sensitivity setting value of the photography mechanism, are automatically done for the microscope and photography mechanism. If these control units are attached to the mechanical and optical systems shown in FIG. 1, the whole apparatus is complicated, resulting in high manufacturing cost. Further, this embodiment cannot always be applied when the confocal scanner and photography mechanism are additionally mounted on a general microscope assuming manual operation.

These problems can be solved by displaying a message on the display panel 48 shown in FIG. 1 without using an output signal from the comparator 59' as a control signal, and recommending or warning a change of the operation setting conditions to a user, so that the user can manually execute the above-described automatic control. In this case, the user can obtain proper information while monitoring an output signal from the comparator 59' in the third embodiment, thus finding out optimal setting conditions. Even if the automatic control by the electric mechanism is not done, the user operability is improved.

In the third embodiment, the rotational speed of the disk scanner is controlled not to exceed the range defined by at least one of the upper and lower limits. Alternatively, the brightness of the optical system of the microscope and the exposure correction amount and sensitivity setting value of the photography mechanism can be controlled using a reference signal corresponding to the optimal scanner rotational speed so as to maintain an optimal number of turns of the scanner.

(Modification of Third Embodiment)

A modification of the third embodiment will be explained.

Figure 5:
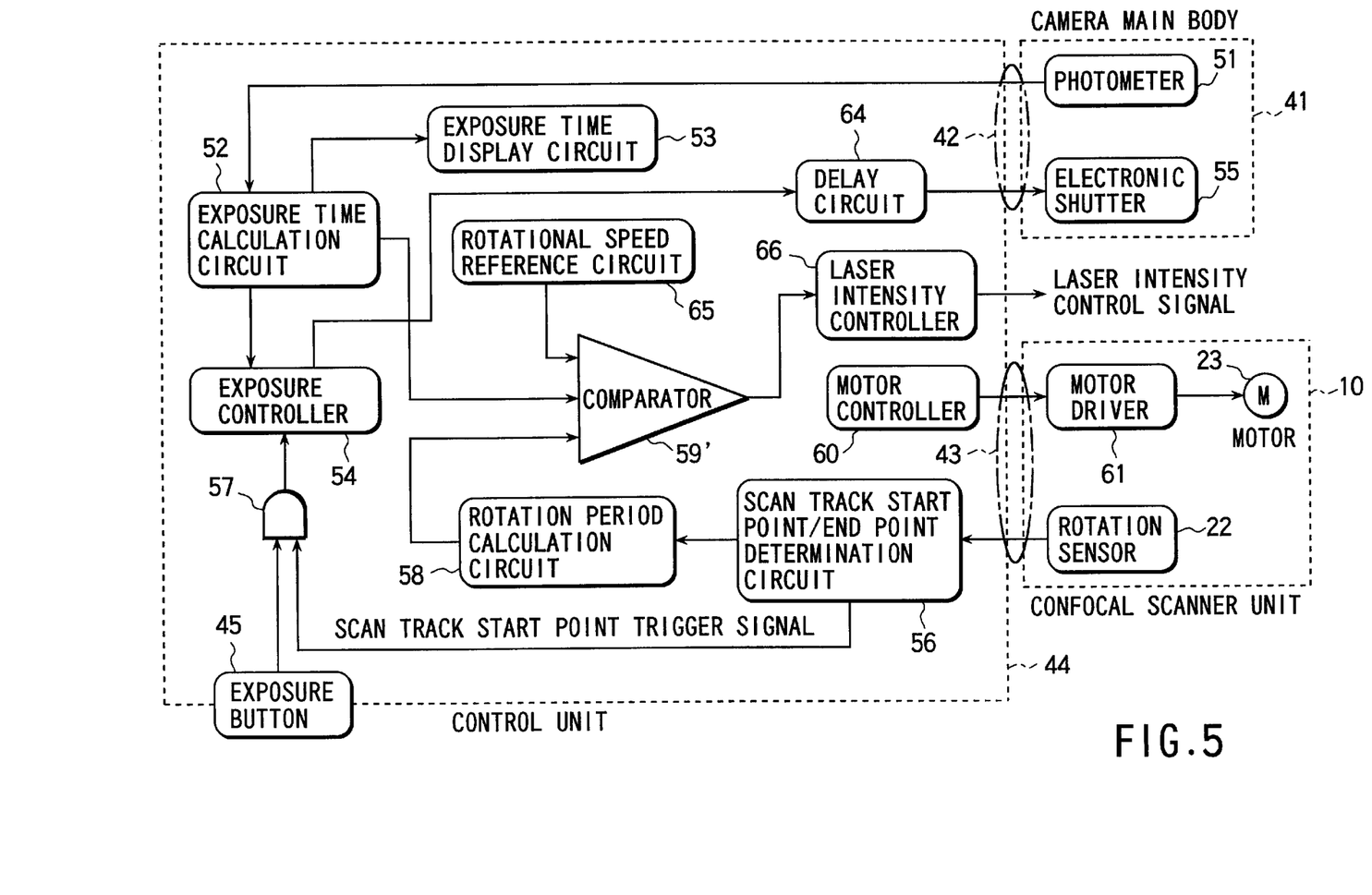
FIG. 5 is a block diagram showing a circuit arrangement according to a modification of the third embodiment.

FIG. 5 is a block diagram showing the arrangement of an electronic circuit according to the modification of the third embodiment provided to the control unit 44, camera main body 41, and confocal scanner unit 10. The electronic circuit shown in FIG. 5 is basically the same as that shown in FIG. 4 except for the following difference.

In this modification, an output from the comparator 59' is supplied to only the laser intensity controller 66, and is not supplied to a motor controller 60. In this case, the motor 23 and motor driver 61 do not form any feedback control loop. Setting values such as the brightness of the optical system on the microscope side and the exposure correction amount and sensitivity setting value of the photography mechanism are controlled to make the exposure time concordant with the number of turns of the motor 23.

This arrangement does not require any feedback control loop for controlling the rotational speed of the motor 23, so that the motor 23 can be continuously rotated while maintaining a constant rotational speed. Hence, the motor 23 and motor driver 61 can be made up of low-cost components not having any rotational speed control function, reducing the manufacturing cost of the rotating system of the disk scanner.

In the modification of the third embodiment as well as the third embodiment, the variable controlled by an output from the comparator 59' is not limited to the intensity of the laser source of the microscope. The variable may be controlled by an alternative function, such as an ND filter, of controlling the brightness of the optical system. Also, setting values such as the exposure correction amount and sensitivity setting value of the photography mechanism may be controlled to change the exposure time.

In the first to third embodiments, the present invention is applied to the optical system using the disk scanner constituted by coupling the condensing disk 12 having the microlenses 12a and the pinhole disk 11 having the pinholes 11a, as shown in FIG. 1. However, the present invention is not limited to the presence/absence of the condensing disk 12.

The present invention can also be applied to a reflection confocal microscope for observing a reflected image of the specimen 1 that is constituted by replacing the dichroic mirror 13 in FIG. 1 with an optical path split element such as a half-mirror or deflection beam splitter. Further, the photometric optical path and photometer 51 may be arranged not inside the camera main body 41, but at portions branched by an optical path split element or movable mirror from a proper position of the optical path extending from the specimen 1 to the image surface 26.

In the first to third embodiments, a storage circuit for storing a photometric signal is omitted for descriptive convenience, and circuit operation of performing control during photometry has been explained. However, a storage circuit for temporarily storing a signal from the photometer can be adopted to perform photometry and exposure at separate timings. For example, it is possible to temporarily insert a mirror in a proper position on the optical path extending from the specimen 1 to the image surface 26 to branch the photometric optical path and perform photometry, store the results, and then photograph an image based on the stored photometric results while the mirror is removed from the optical path.

The photography mechanism is not limited to a camera for taking a silver halide picture, but can also be a digital still camera using a semiconductor image sensor such as a CCD. In this case, when the exposure time is determined by performing pre-exposure for determining exposure and photographing conditions by the semiconductor image sensor, a photometric signal is set based on the results of pre-exposure and used for rotation control of the disk scanner.

The electronic shutter 55 in FIGS. 2 to 5 is not limited to a mechanical and optical one for mechanically opening/closing the optical path. The electronic shutter 55 includes an electrical switching element for the semiconductor image sensor that allows reading charges from the semiconductor image sensor in the digital still camera using a semiconductor image sensor such as a CCD.

The arrangements described in the first to third embodiment can also be applied as an exposure/rotation control method in photographing for color photographing control, in which images are photographed by sequentially switching laser beams having three, red, green, and blue (R, G, and B) laser wavelengths, and the photographed images of the respective colors are made to overlap each other. Similarly, these arrangements can be applied as an exposure/rotation control method in photographing in an application purpose (multi-wavelength excitation or multi-wavelength fluorescence) of multiple-exposing a specimen whose cells are dyed with a plurality of fluorochromes while changing laser beams or the spectral characteristics of the dichroic mirror 13 in FIG. 1 in medical and biological study purposes.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A confocal microscope apparatus comprising:
    a light-emitting portion for emitting a light beam with which a specimen to be observed is irradiated;
    a rotatable disk scanner having a plurality of pinholes formed in a disk for the light beam to pass therethrough between said light-emitting portion and the specimen, said pinholes being arranged to move through a first position facing said light-emitting portion and scan the specimen with the light beam having passed through said pinholes, along with rotation of said disk scanner;
    a confocal optical system for conjugating said first position and a second position on the specimen to cause the light beam having passed through said pinholes to be radiated onto the specimen, and to cause a light beam from the specimen to form an image on said disk;
    a camera for photographing a still image of the image formed by said confocal optical system;
    means for generating an exposure time signal representing an exposure time of said camera;
    means for generating a rotational period signal representing a rotational period of said disk scanner;
    means for comparing the exposure time signal with the rotational period signal to generate based on a comparison result a signal concerning at least one certain condition which must be changed among conditions of said disk scanner, said confocal optical system, and said camera;
    wherein said certain condition comprises a rotational speed of said disk scanner;
    means for automatically changing said certain condition on the basis of the comparison result; and
    means for switching whether to control the rotational speed of said disk scanner in association with the exposure time.

2. The apparatus according to claim 1, further comprising means for displaying a message for instructing a change of said certain condition on the basis of the comparison result.

3. A confocal microscope apparatus comprising:
    a light-emitting portion for emitting a light beam with which a specimen to be observed is irradiated;
    a rotatable disk scanner having a plurality of pinholes formed in a disk for the light beam to pass therethrough between said light-emitting portion and the specimen, said pinholes being arranged to move through a first position facing said light-emitting portion and scan the specimen with the light beam having passed through said pinholes, alone with rotation of said disk scanner;
    a confocal optical system for conjugating said first position and a second position on the specimen to cause the light beam having passed through said pinholes to be radiated onto the specimen, and to cause a light beam from the specimen to form an image on said disk;
    a camera for photographing a still image of the image formed by said confocal optical system;
    means for generating an exposure time signal representing an exposure time of said camera;

means for generating a rotational period signal representing a rotational period of said disk scanner;

means for comparing the exposure time signal with the rotational period signal to generate based on a comparison result a signal concerning at least one certain condition which must be changed among conditions of said disk scanner, said confocal optical system, and said camera;

means for automatically changing said certain condition on the basis of the comparison result;

wherein said certain condition comprises a rotational speed of said disk scanner; and a rotation sensor for detecting a rotational position of said disk scanner, and wherein the rotational period signal is calculated based on a detection result by said rotation sensor.

4. The apparatus according to claim 3, further comprising means for selectively multiplying the calculated rotational period signal to compare the multiplied rotational period signal with the exposure time signal.

5. The apparatus according to claim 3, further comprising means for displaying a message for instructing a change of said certain condition on the basis of the comparison result.

6. A confocal microscope apparatus comprising:

a light-emitting portion for emitting a light beam with which a specimen to be observed is irradiated;

a rotatable disk scanner having a plurality of pinholes formed in a disk for the light beam to pass therethrough between said light-emitting portion and the specimen, said pinholes being arranged to move through a first position facing said light-emitting portion and scan the specimen with the light beam having passed through said pinholes, alone with rotation of said disk scanner;

a confocal optical system for conjugating said first position and a second position on the specimen to cause the light beam having passed through said pinholes to be radiated onto the specimen, and to cause a light beam from the specimen to form an image on said disk;

a camera for photographing a still image of the image formed by said confocal optical system;

means for generating an exposure time signal representing an exposure time of said camera;

means for generating a rotational period signal representing a rotational period of said disk scanner;

means for comparing the exposure time signal with the rotational period signal to generate based on a comparison result a signal concerning at least one certain condition which must be changed among conditions of said disk scanner, said confocal optical system, and said camera;

wherein said certain condition comprises an intensity of the light beam emitted by said light-emitting portion; and means for automatically changing said certain condition on the basis of the comparison result.

7. The apparatus according to claim 6, further comprising means for changing the intensity of the light beam when the rotational speed of said disk scanner falls outside a reference range.

8. The apparatus according to claim 7, further comprising photometric means for measuring the intensity of the light beam from the specimen, and wherein the exposure time signal is calculated based on a detection result by said photometric means.

9. The apparatus according to claim 6, further comprising means for displaying a message for instructing a change of said certain condition on the basis of the comparison result.

10. An apparatus for photographing a confocal image in cooperation with a microscope, comprising:

a light-emitting portion for emitting a light beam with which a specimen to be observed is irradiated;

a rotatable disk scanner having a plurality of pinholes formed in a disk for the light beam to pass therethrough between said light-emitting portion and the specimen, said pinholes being arranged to move through a first position facing said light-emitting portion and scan the specimen with the light beam having passed through said pinholes, along with rotation of said disk scanner;

an optical system portion for forming, in cooperation with an optical system portion of said microscope, a confocal optical system for conjugating said first position and a second position on the specimen to cause the light beam having passed through said pinholes to be radiated onto the specimen, and to cause a light beam from the specimen to form an image on said disk;

a camera for photographing a still image of the image formed by said confocal optical system;

means for generating an exposure time signal representing an exposure time of said camera;

means for generating a rotational period signal representing a rotational period of said disk scanner;

means for comparing the exposure time signal with the rotational period signal to generate based on a comparison result a signal concerning at least one certain condition which must be changed among conditions of said disk scanner, said confocal optical system, and said camera;

wherein said certain condition comprises a rotational speed of said disk scanner;

means for automatically changing said certain condition on the basis of the comparison result; and means for switching whether to control the rotational speed of said disk scanner in association with the exposure time.

11. The apparatus according to claim 10, further comprising means for displaying a message for instructing a change of said certain condition on the basis of the comparison result.

12. An apparatus for photographing a confocal image in cooperation with a microscope, comprising:

a light-emitting portion for emitting a light beam with which a specimen to be observed is irradiated;

a rotatable disk scanner having a plurality of pinholes formed in a disk for the light beam to pass therethrough between said light-emitting portion and the specimen, said pinholes being arranged to move through a first position facing said light-emitting portion and scan the specimen with the light beam having passed through said pinholes, along with rotation of said disk scanner;

an optical system portion for forming, in cooperation with an optical system portion of said microscope, a confocal optical system for conjugating said first Position and a second position on the specimen to cause the light beam having passed through said pinholes to be radiated onto the specimen, and to cause a light beam from the specimen to form an image on said disk;

a camera for photographing a still image of the image formed by said confocal optical system;

means for generating an exposure time signal representing an exposure time of said camera;

means for generating a rotational period signal representing a rotational period of said disk scanner;

means for comparing the exposure time signal with the rotational period signal to generate based on a comparison result a signal concerning at least one certain condition which must be changed among conditions of said disk scanner, said confocal optical system, and said camera;

wherein said certain condition comprises a rotational speed of said disk scanner;

means for automatically changing said certain condition on the basis of the comparison result; and a rotation sensor for detecting a rotational position of said disk scanner, and wherein the rotational period signal is calculated based on a detection result by said rotation sensor.

13. The apparatus according to claim 12, further comprising means for selectively multiplying the calculated rotational period signal to compare the multiplied rotational period signal with the exposure time signal.

14. The apparatus according to claim 12, further comprising means for displaying a message for instructing a change of said certain condition on the basis of the comparison result.

15. An apparatus for photographing a confocal image in cooperation with a microscope, comprising:

a light-emitting portion for emitting a light beam with which a specimen to be observed is irradiated;

a rotatable disk scanner having a plurality of pinholes formed in a disk for the light beam to pass therethrough between said light-emitting portion and the specimen, said pinholes being arranged to move through a first position facing said light-emitting portion and scan the specimen with the light beam having passed through said pinholes, along with rotation of said disk scanner;

an optical system portion for forming, in cooperation with an optical system portion of said microscope, a confocal optical system for conjugating said first position and a second position on the specimen to cause the light beam having passed through said pinholes to be radiated onto the specimen, and to cause a light beam from the specimen to form an image on said disk;

a camera for photographing a still image of the image formed by said confocal optical system;

means for generating an exposure time signal representing an exposure time of said camera;

means for generating a rotational period signal representing a rotational period of said disk scanner;

means for comparing the exposure time signal with the rotational period signal to generate based on a comparison result a signal concerning at least one certain condition which must be chanted among conditions of said disk scanner, said confocal optical system, and said camera; and means for automatically changing said certain condition on the basis of the comparison result; and wherein said certain condition comprises an intensity of the light beam emitted by said light-emitting portion.

16. The apparatus according to claim 15, further comprising means for changing the intensity of the light beam when the rotational speed of said disk scanner falls outside a reference range.

17. The apparatus according to claim 16, further comprising photometric means for measuring the intensity of the light beam from the specimen, and wherein the exposure time signal is calculated based on a detection result by said photometric means.

18. The apparatus according to claim 15, further comprising means for displaying a message for instructing a change of said certain condition on the basis of the comparison result.

* * * * *